E. A. PATERSON.
ROAD MAKING AND BINDING MATERIALS THEREFOR.
APPLICATION FILED JAN. 9, 1912.
1,042,474.                                         Patented Oct. 29, 1912.
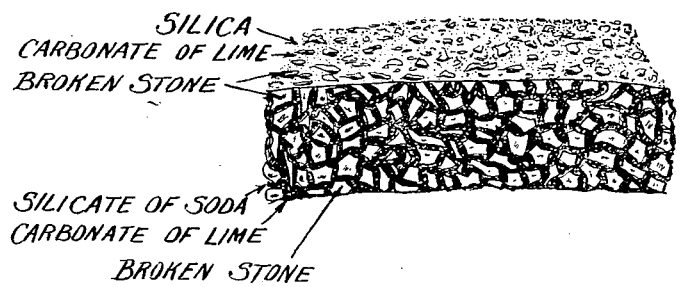
Witnesses:
Inventor:
Edward A. Paterson
By his Attorneys:

UNITED STATES PATENT OFFICE.

EDWARD ALFRED PATERSON, OF PORT ARTHUR, ONTARIO, CANADA.

ROAD-MAKING AND BINDING MATERIALS THEREFOR.

1,042,474.  Specification of Letters Patent.  Patented Oct. 29, 1912.

Application filed January 9, 1912. Serial No. 670,341.

*To all whom it may concern:*

Be it known that I, EDWARD ALFRED PATERSON, a subject of the King of Great Britain, residing at Port Arthur, in the Province of Ontario, Dominion of Canada, have invented certain new and useful Improvements in Road-Making and Binding Materials Therefor, of which the following is a specification.

My present invention relates to roads and materials for making them of the kind described in my U. S. Patents No. 987,597 of Mar. 21, 1911 and No. 996,513 of June 27, 1911. In these patents I have described a road in which the road metal is bound by means of a composition consisting essentially of an alkaline silicate and sucrate of lime mixed in such proportions that they provide a good matrix for the road metal or other materials below the surface of the road and when exposed to carbon dioxid form calcium silicate on the surface of the road which acts as a strong and durable binding agent and provides a good wearing surface.

I have discovered that a less expensive binding agent may be produced for use when the more expensive material is not suitable by employing an alkaline silicate and carbonate of lime mixed in such proportions that when wet a good matrix is afforded and when exposed to the action of carbon dioxid a surface will be produced on the road consisting essentially of silica and carbonate of lime. The carbonate of lime employed is not decomposed but acts by its presence physically in effecting the decomposition of the alkaline silicate to produce silica which is a hard, insoluble and durable material, and an alkaline carbonate, which is soluble and is washed away.

The accompanying drawing is a perspective view of a section of road, the preferred composition of the road being specified on the drawing.

Preferably I employ silicate of soda and carbonate of lime and when these are used in the manner above described the carbonate of lime will remain as such on the surface, while silica and sodium carbonate will be produced, the sodium carbonate being easily washed away while the silica and carbonate of lime, both of which are insoluble, will remain and form an efficient matrix for the road metal or other materials employed and a good wearing surface. When the reaction first takes place gelatinous silica is produced but this loses its water and in hardening to form silica effects the desired binding action. The binding material described may be used in connection with broken rock, gravel, sand, earth, etc., in the manner hereinafter described.

I may mix the alkaline silicate and carbonate of lime in various ways. Thus I may make a solution of silicate of soda of a strength varying from 25° to 50° Twaddell and mix with it powdered carbonate of lime and apply this composition to the other materials. Or the solution of alkaline silicate may be made separately and the powdered carbonate of lime separately applied to or mixed with the other road materials, the alkaline silicate being applied to the road by a watering cart or in any other convenient way. Or I may employ the alkaline silicate in a dry soluble form with powdered carbonate of lime and mix them with water in suitable proportions either just before applying to the road or immediately thereafter. In either case, when the binding material is applied, it will form a good matrix for binding together the other road materials and will, when exposed to the action of carbon dioxid, have its alkaline silicate decomposed forming on the surface of the road gelatinous silica which hardens and remains and carbonate of soda, which being soluble is washed away, while the carbonate of lime which is insoluble, hardens and remains, being employed to assist physically by its presence in the decomposition of the alkaline silicate and as a factor in the cementing or binding action which takes place.

Silicate of soda, when mixed with carbonate of lime and exposed to the air, loses water and is decomposed by the carbon dioxid of the air forming carbonate of soda and gelatinous silica. Practically no silicate of lime is formed but the separation of gelatinous silica causes a cementing action on the surface of the road while the silicate of soda in the interior tends to remain soft until exposed by the wearing away of the road when it will be attacked by the carbon dioxid of the air and renew the surface in the manner before described. When silicate of soda and carbonate of lime are employed the reactions in the presence of carbon dioxid are as follows:

$$Na_2O,4SiO_2,(H_2O) + CaCO_3 + CO_2 = Na_2CO_3 + 4SiO_2 + CaCO_3 + CO_2 + H_2O.$$

In making a road with broken stone as the road metal, the solution may be applied in the manner described in my patents above mentioned.

When making earth roads, I preferably first form the road of the desired camber and then harrow carbonate of lime into it in the proportion of from 30 lbs. to 50 lbs. per square yard of road surface and then apply the alkaline solution. Or the powdered carbonate of lime may be mixed with the alkaline solution and kept agitated in an ordinary watering cart or other suitable appliance for supplying it to the road in such manner that it will percolate through or into the porous surface thereof. It is desirable that the road be dampened as by a watering cart before the solution is applied.

When gravel or sand is used I may proceed in the same manner as when the road is made of earth. In any case, the road metal is cemented or bound by a binding agent consisting of carbonate of lime and an alkaline silicate which remains comparatively soft in the interior of the road while on the surface silica is formed which together with the undissolved and undecomposed carbonate of lime, provide not only a superior binding material but also a hard insoluble and durable wearing surface.

While the atmosphere will provide sufficient carbon dioxid to produce the reactions specified, the process may be hastened by supplying carbon dioxid in other ways as by watering the road with carbonic acid water. Strontium carbonate and barium carbonate, when mixed with silicate of soda and exposed to carbon dioxid, will have the same effect as carbonate of lime, but I employ carbonate of lime as the most available of these materials. When dry silicate of soda is used it should be easily soluble in hot or cold water without having an excess of alkali.

The strength of the silicate of soda solution employed will depend on the nature of the other materials used in the road whether broken rock, gravel, sand, earth, etc., and the relative proportions of the alkaline silicate and carbonate of lime will be determined somewhat by the strength of the alkaline solution and the nature of the other materials used, thus when the alkaline solution is of a strength of 50° Twaddell and broken rock is used the solution should consist of seven parts alkaline silicate and fifty parts carbonate of lime. When applied to an earth road the strength of the solution may be 40° Twaddell and the proportions 12½ parts alkaline solution and forty parts carbonate of lime.

Paving and building blocks may also be formed in the manner above specified.

In the presence of calcium carbonate a freer interchange of atoms occurs between the silicate of soda and the carbon dioxid and under humid conditions the calcium carbonate assists in throwing off the carbonate of soda and the contained water of the silicate of soda.

I claim as my invention:

1. A substance for use in road making, comprising essentially carbonate of lime and an alkaline silicate mixed in such proportions as to form when wet and exposed to the action of carbon dioxid and dried a hard insoluble and durable binder composed of silica and carbonate of lime.

2. A substance for use in road making, comprising essentially carbonate of lime and sodium silicate in a dry form (easily soluble in hot or cold water without having an excess of alkali) mixed in suitable proportions to form when wet and exposed to the action of carbon dioxid in the open air a hard, insoluble and durable binder consisting of silica and carbonate of lime.

3. The process of forming a binding agent for roads, which consists in mixing together in suitable proportions sodium silicate and carbonate of lime and subjecting them while wet to the action of carbon dioxid in the open air to produce soluble sodium carbonate and a hard insoluble and durable binding agent consisting of silica and carbonate of lime.

4. A road, consisting of a road metal, an alkaline silicate and carbonate of lime in the interior and carbonate of lime and silica on the surface.

In testimony whereof, I have hereunto subscribed my name.

EDWARD ALFRED PATERSON.

Witnesses:
   ETHEL B. STEVENSON,
   HAZEL BAKER.

---

Copies of this patent may be obtained for five cents each, by addressing the "Commissioner of Patents, Washington, D. C."